United States Patent [19]

Fodor

[11] 4,104,326

[45] Aug. 1, 1978

[54] RESINOUS RADIAL-LINEAR COPOLYMER BLEND HAVING BLOCKS WITH A HETEROGENEITY INDEX RANGING FROM 2.5 TO 4

[75] Inventor: Lawrence M. Fodor, Bartlesville, Okla.

[73] Assignee: Phillips Petroleum Company, Bartlesville, Okla.

[21] Appl. No.: 813,582

[22] Filed: Jul. 7, 1977

[51] Int. Cl.² .................. C08L 51/00; C08L 53/00
[52] U.S. Cl. ...................... 260/876 B; 260/878 B
[58] Field of Search ..................... 260/876 B, 880 B

[56] References Cited

U.S. PATENT DOCUMENTS

| | | | |
|---|---|---|---|
| 3,465,065 | 9/1969 | Moss et al. ........................... | 260/879 |
| 3,507,934 | 4/1970 | Minor ................................. | 260/876 B |
| 3,639,517 | 2/1972 | Kitchen et al. ...................... | 260/879 |
| 3,639,521 | 2/1972 | Hsieh ................................. | 260/880 |
| 4,048,255 | 9/1977 | Hillier et al. ..................... | 260/859 R |
| 4,051,197 | 9/1977 | Fodor ................................. | 260/876 B |

*Primary Examiner*—Richard B. Turer

[57] ABSTRACT

A blend of (1) a resinous linear block copolymer of a monovinyl-substituted aromatic compound and a conjugated diene, said linear block copolymer having a heterogeneity index for the monovinyl-substituted aromatic compound blocks outside the range of 2.5 to 4, and (2) a resinous radial block copolymer of a monovinyl-substituted aromatic compound and a conjugated diene, said radial block copolymer having a heterogeneity index for the monovinyl-substituted aromatic compound blocks outside the range of 2.5 to 4, said blend having a heterogeneity index for the monovinyl-substituted aromatic compound blocks within the range of 2.5 to 4.

10 Claims, No Drawings

4,104,326

RESINOUS RADIAL-LINEAR COPOLYMER BLEND HAVING BLOCKS WITH A HETEROGENEITY INDEX RANGING FROM 2.5 TO 4

BACKGROUND OF THE INVENTION

This invention relates to high impact blends of radial and linear resinous block copolymers of monovinyl-substituted aromatic compounds and conjugated dienes.

It is well known to produce impact polystyrene by blending a rubber with the polystyrene. This results in an improvement in the impact strength of the polystyrene but with a substantial sacrifice with respect to other properties. It is also known that some, but not all, radial block copolymers exhibit high impact strength, see for instance Kitchen et al, U.S. Pat. No. 3,369,517.

It would be desirable to achieve a broader scope of monovinyl-substituted aromatic compound/diene copolymer compositions having the high impact resistance associated with the specific radial polymer of said Kitchen et al patent without the disadvantages associated with rubber reinforced resinous materials.

SUMMARY OF THE INVENTION

It is an object of this invention to provide high impact block copolymer blends; and It is yet a further object of this invention to provide an improved blend of monovinyl-substituted aromatic compound/conjugated diene copolymers.

In accordance with this invention, there is provided a blend of a resinous radial copolymer of a monovinyl-substituted aromatic compound/conjugated diene and a resinous linear copolymer of a monovinyl-substituted aromatic compound/conjugated diene, which blend has a heterogeneity index for the monovinyl-substituted aromatic compound block within the range of 2.5 to 4.

DESCRIPTION OF THE PREFERRED EMBODIMENTS

It has been found that the high impact strength of resinous radial block copolymers made with incremental addition of the monovinyl-substituted aromatic compound and initiator is related to the morphology of the copolymers. Specifically, it has been found that with a very low heterogeneity index for the monovinyl-substituted aromatic compound block, the morphology is characterized by spheres of the polymerized diene component in a continuum of polymerized monovinyl-substituted aromatic compound component. When an article molded from such a resin is subjected to impact, the polystyrene phase takes most of the shock, hence relatively low impact values are to be expected. At higher heterogeneity indexes, the morphology becomes lamellar and the impact strength is quite high. As the heterogeneity index is further increased, an inverted structure exhibiting spheres or ellipsoids of the polymerized monovinyl-substituted aromatic compound in a continuum of polymerized diene is formed. This structure gives a cheesy (weak and crumbly) product. It has been found that the morphology is related to a tangent delta value obtained in a dynamic viscoelastic test. If the stress-strain behavior is viewed as related to a spring and dashpot, the tangent delta values relate to the extent the dashpot component exists, i.e., the extent to which completely elastic behavior is not obtained. Specifically, as it relates to the blends of this invention, those having a heterogeneity index below about 2.5 exhibit the morphology characterized by spheres of the polymerized diene component in a continuum of the polymerized monovinyl-substituted aromatic compound component as evidenced by the tangent delta maximum values. From about 2.5 to about 4, the tangent delta maximum values indicate lamellar configuration; above about 4, the tangent delta maximum values indicate an inverted structure. At about the transition between the low impact blends having a low heterogeneity index indicative of the spherical configuration and the high impact blends having an intermediate heterogeneity index indicative of the lamellar configuration, there may be a transition configuration wherein cylindrical polydiene domains are found in a continuum of polystyrene.

Thus in accordance with the invention, at least one resinous linear, normally solid block copolymer of at least one monovinyl-substituted aromatic compound and at least one conjugated diene is mixed with at least one coupled resinous radial, normally solid block copolymer of at least one monovinyl-substituted aromatic compound and at least one conjugated diene in suitable proportions to prepare the impact resistant blends characteristic of this invention. If there is a substantial difference in the molecular weights of the monovinyl-substituted aromatic compound portion of the radial and linear copolymers, the desired heterogeneity index can be obtained with a relatively large amount of one and a relatively small amount of the other. For instance, blends ranging from 90:10 to 10:90 weight percent radial copolymer to linear copolymer are possible although generally blends will contain about 50 to about 65 weight percent of the high molecular weight portion whether it be the linear or the radial, and about 50 to 35 weight percent of the low molecular weight portion, this being radial when the high molecular weight is linear, and linear when the high molecular weight portion is radial.

The term "resinous" is used in the conventional sense to mean a normally solid material not having rubbery properties. Generally, such materials will have a Shore D hardness (ASTM D-1706-61) of greater than 62, generally greater than 65. The constituent components will generally have from 41 to 95 weight percent polymerized monovinyl-substituted aromatic compound component, preferably from 50 to 95 weight percent polymerized monovinyl-substituted aromatic compound component, most preferably 70 to 95 weight percent polymerized monovinyl-substituted aromatic content. The final composition will generally contain at least 45, preferably at least 50, percent polymerized monovinyl-substituted aromatic component even if one of the components may have slightly less than that amount. Most preferably the final composition contains from 70 to 95 weight percent polymerized monovinyl-substituted aromatic component.

The weight average and number average molecular weights used in calculating the heterogeneity index values are calculated as is known in the art based on the quantities of reagents used in each recipe. Specifically, monodispersity is assumed which is a reasonable approximation since the molecular weight distribution of each polymer produced is extremely narrow. Then the number of moles of initiator is divided into the number of grams of monomer to give grams of polymer per mole or number average molecular weight which is essentially the same as weight average. This is then substituted into the formula set out hereinbelow. Past experience based on actually digesting a copolymer in peroxide to cleave out the polymerized styrene block, which was then analyzed utilizing gel permeation chromatography has shown the calculated values to agree closely with the measured values.

Heterogeneity index (HI) is expressed by the formula $$HI = \frac{\overline{M}_w}{\overline{M}_n} = \frac{\frac{W_1 S_1 M_{S1} + W_2 S_2 M_{S2}}{W_1 S_1 + W_2 S_2}}{\frac{N_1 M_{S1} + N_2 M_{S2}}{N_1 + N_2}}$$

where:
$W$ is weight of fraction (1 is major, 2 is minor)
$S$ is styrene content of fraction
$N$ is moles styrene blocks in fraction
$M_s$ is molecular weight of styrene block in fraction The above formula is for the case where two polymers are mixed. Three or more polymers can be used, if desired, and such blends are within the scope of the invention.

As an example of the calculations, the following is a calculation of the HI for Run 10 Table II.

$W_1 = 0.54$
$W_2 = 0.46$
$S_1 = 0.92$
$S_2 = 0.54$
$M_{S1} = 203,000$
$M_{S2} = 15,500$
$N_1 = 0.000244$
$N_2 = 0.0016$ $$HI = \frac{\overline{M}_w}{\overline{M}_n} = \frac{\left(\frac{(0.54)(0.92)(203,000) + (0.46)(0.54)(15,500)}{(0.54)(0.92) + (0.46)(0.54)}\right)}{\left(\frac{(0.000244)(203,000) + (0.0016)(15,500)}{(0.000244) + (0.00160)}\right)}$$

$$= \frac{\left(\frac{104700}{0.745}\right)}{\left(\frac{74.33}{0.00184}\right)} = 3.48$$

The radial polymers utilized in this invention can be described by the notation (A—B)$_n$Y, where A represents a block of polymer of a monovinyl-substituted aromatic hydrocarbon, B represents a block polymer of a conjugated diene, Y represents the residue of a polyfunctional coupling agent, and $n$ represents the number of functional groups of the coupling agent which have entered into the coupling reaction and is an integer of at least 3. These radial polymers can be prepared according to the method of Kitchen et al, U.S. Pat. No. 3,639,517, except that only a single addition of the monovinyl-substituted aromatic compound and initiator is necessary. The disclosure of said Kitchen et al patent is hereby incorporated by reference. Briefly, and in accordance with the procedure outlined therein, sequential polymerization of styrene or other monovinyl-substituted aromatic hydrocarbon and butadiene or other conjugated diene is carried out using an organolithium initiator and thereafter the resulting lithium-terminated polymer is coupled with the polyfunctional coupling agent. As noted hereinabove, however, only a single charge of monovinyl-substituted aromatic compound and initiator is required for the components of the blends of the invention. Styrene and 1,3-butadiene are the presently preferred monomers.

The linear polymer component can be produced in several ways well known in the art. One group of linear polymers suitable for use in this invention can be described by the notation (A—B)$_2$X, where the symbols A and B have the same meaning as before and X is the residue of a difunctional coupling agent. These polymers can be prepared according to said Kitchen et al patent by substituting a difunctional coupling agent such as ethyl acetate for the polyfunctional coupling agent and, as with the radial components, only single initiator charge is used. Difunctional coupling agents are further described in Zelinski et al, U.S. Pat. No. 3,280,084, and Hsieh, U.S. Pat. No. 3,639,521, the disclosures of which are also incorporated by reference.

Another group of useful linear polymers are those described by the notation A—B—A made by sequential addition of the initiator and first segment of monovinyl-substituted aromatic compound which is polymerized; thereafter the conjugated diene component is added and polymerized, and finally the second increment of monovinyl-substituted aromatic compound is added and polymerized. Of course, in these instances the first and second A blocks are such that the initial polymer has a heterogeneity index outside the range of 2.5 to 4.

In addition to the separate preparation of the radial and linear polymers, it is possible to produce the blends of this invention in situ following the procedure of said Kitchen et al patent, except utilizing a mixture of a difunctional coupling agent, and a coupling agent having at least three reactive sites.

It is noted that simple A—B polymers are not suitable as one of the components of this invention since the use of linear A—B polymer in place of linear A—B—A polymer results in a cheesy product no matter what the HI is.

Suitable monovinyl-substituted aromatic compounds or mixtures thereof are those containing 8 to 18 carbon atoms per molecule. Examples of suitable compounds include styrene, 3-methylstyrene, 4-n-propylstyrene, 4-cyclohexylstyrene, 4-decylstyrene, 2-ethyl-4-benzylstyrene, 4-p-tolylstyrene, 4-(4-phenyl-n-butyl) styrene, 1-vinylnaphthalene, 2-vinylnaphthalene, and the like and mixtures thereof. Styrene is the preferred monovinyl-substituted aromatic compound and for the sake of simplicity, the invention hereinafter will be described in terms of utilizing styrene, it being understood that the invention is not limited to the use of styrene as the monovinyl-substituted aromatic compound.

Suitable conjugated dienes or mixtures thereof that can be used in this invention include those having 4 to 12 carbon atoms per molecule, those containing 4 to 8 carbon atoms being preferred. Exemplary of suitable compounds are 1,3-butadiene, isoprene, 2,3-dimethyl-1,3-butadiene, piperylene, 3-butyl-1,3-octadiene, and the like. The preferred diene is 1,3-butadiene and the invention hereinafter will be described in terms of butadiene, it being understood that butadiene hereinafter is referred to as exemplary only and the invention is not intended to be limited thereto.

The polymerization initiators employed according to this invention are well known in the art and can be broadly depicted as organolithium initiators. Those preferred are hydrocarbyl monolithium compounds and can be represented by the formula RLi where R is a hydrocarbon radical selected from aliphatic, cycloaliphatic, or aromatic radicals containing from about 1 to 20 carbon atoms per molecule. Exemplary initiators suitable for use according to this invention include: n-butyllithium, sec-butyllithium, methyllithium, phenyllithium, naphthyllithium, p-tolyllithium, cyclohexyllithium, eicosyllithium, and the like. Because it is particularly effective, n-butyllithium is presently preferred.

Exemplary polyfunctional treating agents (i.e., treating agents having at least three functional groups per molecule) that can be used in accordance with this invention in the preparation of the branched block copolymers are the polyepoxides such as epoxidized linseed oil, epoxidized soybean oil, and 1,2,5,6,9,10-triepoxydecane; polyimines such as tri(1-aziridinyl)-phosphine oxide; polyisocyanates such as benzene-1,2,4-triisocyanate; polyaldehydes such as 1,4,7-naphthalene-tricarboxyaldehyde; polyhalides such as silicon tetrachloride or polyketones such as 1,4,9,10-anthracenetetrone and polyalkoxysilanes such as methyltrimethoxysilane.

Suitable difunctional coupling agents include the diisocyanates, diimines (diaziridinyl), dialdehydes, dihalides, and the like. Exemplary compounds are: benzene-1,4-diisocyanate; naphthalene-2,6-diisocyanate; naphthalene-1,3-diisocyanate; di(1-aziridinyl)ethyl phosphine oxide; di(2-phenyl-1-aziridinyl)propyl phosphine oxide; di(2,3-dimethyl-aziridinyl)hexyl phosphine sulfide; 1,4-naphthalene dicarboxyaldehyde; 1,9-anthracene dicarboxyaldehyde; 2,4-hexanedione; 1,10-anthracenedione; dichlorodiethylsilane; dibromodibutylsilane; difluorodicyclohexylsilane; di-n-hexyldifluorotin; diphenyldibromotin; diethyldiallyltin; dicyclohexyldichlorotin; didodecylchlorobromotin; di(3-methylphenyl)chloroallyltin; and the like.

Another suitable difunctional treating agent is carbon dioxide.

The preferred difunctional coupling agents are esters of the formula

which are believed to react as follows:

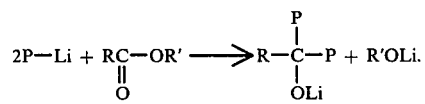

R and R' are preferably 1 to 6 carbon alkyl radicals. Most preferred is ethyl acetate.

The linear and radial polymer blends are prepared by intimately mixing the solid polymers by means of an extruder, roll mill, Banbury mixer, and the like, or by mixing the polymer cements together and separating the solvent from the polymer mixture.

The TAN $\delta$ maximum and T (TAN $\delta$ maximum) values were obtained by means of a Vibron Direct Reading Viscoelastometer, Model DVV-II (Toyo Instruments Co., Tokyo, Japan). The Vibron experiments were made on test samples cut from compression molded film having dimensions about $\frac{1}{8}$ inch wide (0.05 cm), 1.2 inches long (3 cm) and about 10 mils (0.025 cm) in thickness. Each test sample was measured at 35 Hz at temperatures ranging from about $-100°$ C to about $20°$ C.

EXAMPLE I

A series of diblock copolymers containing polymerized styrene and polymerized butadiene was prepared in a stirred, 5 gallon (0.02 m$^3$) stainless steel reactor. The abbreviations for the various compounds used in the preparations are as follows:

| | |
|---|---|
| Cyclohexane | CyC$_6$ |
| Tetrahydrofuran | THF |
| n-Butyllithium | NBL (7.5 wt.% in CyC$_6$) |
| Styrene | S |
| Butadiene | B |
| Ethyl acetate (difunctional coupling agent) | EA |
| Methyltrimethoxysilane (trifunctional coupling agent) | MTMS |
| Tris(nonylphenyl)phosphite | TNPP |
| 2,6-di-t-butyl-4-methylphenol | BHT |

The order of addition was: cyclohexane, styrene, THF, NBL, reaction, butadiene, reaction, coupling agent. Each polymer sample after coupling with either EA or MTMS was treated with 3 cc water and 60 psig (414 kPa gage) CO$_2$ was charged to the reactor. After about 10 minutes, a cyclohexane solution containing sufficient TNPP and BHT to give 1.5 parts by weight TNPP per 100 parts by weight dry polymer and 0.5 parts by weight BHT per 100 parts by weight dry polymer was added to the polymer cement and mixed about 10 minutes. A sample of the cement was taken, solvent removed, and the melt flow of the polymer determined according to ASTM D1238-62T at 200° C and 5 kg load.

The difference between the total and initial amounts of cyclohexane used in each run represents the amount used to flush the monomers, NBL and coupling agent into the reactor. Generally, about 0.09 kg cyclohexane is used to flush each component into the reactor in this series.

The quantities of compounds used and conditions employed in preparing the various copolymers are given in Table I.

Table 1

| | | | | | | | | | | | | | | | | |
|---|---|---|---|---|---|---|---|---|---|---|---|---|---|---|---|---|
| | | Preparation of Block Styrene-Butadiene Copolymer | | | | | | | | | | | | | | |
| | | | | | | | Polymerization Conditions | | | | | | Coupling Agent | | Coupled | |
| | | I | | | NBL[1] | | | S | | | B | | | MT- | Poly- | Wt. |
| Run No. | To- tal | Ini- tial | THF (g) | S (g) | (g) | (PH- M) | B (g) | Time (min) | Peak °F | Temp. °C | Time (min) | Peak °F | Temp. °C | EA[2] (g) | MS (g) | Melt Flow | mer Type | Ratio S/B |
| 1 | 4.0 | 3.7 | 0.34 | 1242 | 7.0 | 0.039 | 108 | 21 | 184 | 84 | 20 | 196 | 91 | 0.41 | 0 | 0.76 | linear | 92/8 |
| 1A | 3.4 | 3.1 | 0.28 | 621 | 35.7 | 0.233 | 529 | 21 | 180 | 82 | 20 | 222 | 106 | 0 | 1.4 | 37.2 | radial | 54/46 |
| 2 | 4.3 | 3.9 | 0.36 | 1254 | 12.4 | 0.065 | 171 | 32 | 214 | 101 | 20 | 202 | 94 | 0.64 | 0 | 3.2 | linear | 88/12 |
| 2A | 3.2 | 2.9 | 0.28 | 624 | 39.6 | 0.276 | 451 | 21 | 165 | 74 | 20 | 206 | 97 | 0 | 1.6 | 75.6 | radial | 58/42 |
| 3 | 4.3 | 3.9 | 0.36 | 1254 | 8.9 | 0.047 | 171 | 24 | 178 | 81 | 20 | 200 | 93 | 0.46 | 0 | 0.80 | linear | 88/12 |

Table 1-continued
Preparation of Block Styrene-Butadiene Copolymer

| | | I | | | NBL[1] | | | Polymerization Conditions | | | | | | Coupling Agent | | | Coupled Polymer Type | Wt. Ratio S/B |
|---|---|---|---|---|---|---|---|---|---|---|---|---|---|---|---|---|---|---|
| | | | | | | | | S | | | B | | | | | | | |
| Run No. | Total | Initial | THF (g) | S (g) | (g) | (PH-M) | B (g) | Time (min) | Peak °F | Temp. °C | Time (min) | Peak °F | Temp. °C | EA[2] (g) | MT-MS (g) | Melt Flow | | |
| 3A | 3.2 | 2.9 | 0.28 | 624 | 35.6 | 0.248 | 451 | 25 | 172 | 78 | 20 | 204 | 96 | 0 | 1.4 | 93.0 | radial | 58/42 |
| 4 | 4.0 | 3.7 | 0.34 | 1242 | 7.0 | 0.039 | 108 | 28 | 178 | 81 | 20 | 199 | 93 | 0 | 0.37 | 1.2 | radial | 92/8 |
| 4A | 3.5 | 3.1 | 0.28 | 621 | 35.7 | 0.233 | 529 | 21 | 162 | 72 | 20 | 220 | 104 | 1.8 | 0 | 48.0 | linear | 54/46 |
| 5 | 4.4 | 4.0 | 0.48 | 1796 | 6.1 | 0.048 | 94 | 28 | 185 | 85 | 20 | 183 | 84 | 0.5 | 0 | 4.3 | linear | 95/5 |
| 5A | 2.6 | 2.3 | 0.29 | 455 | 32.9 | 0.440 | 655 | 23 | 160 | 71 | 20 | 244 | 118 | 0 | 3.5 | 21.1 | radial | 41/59 |

[1] 7.5 wt. % solution in cyclohexane, the g refers to the weight of the solution, the PHM to the actual NBL.
[2] 10 wt. % solution in cyclohexane except in 5 and 5A where it is 15%. The numbers refer to the g of solution. The centigrade temperatures are rounded off to the nearest whole number.

EXAMPLE 2

The polymer cements made in Example 1 were combined in pairs, i.e., Runs 1 and 1A, 2 and 2A, etc., stirred thoroughly, about ¼ of the solvent was boiled off and the polymer recovered by flashing the remainder of the solvent at about 330° F (166° C). The product was further dried in a vacuum oven at 99° C after which a portion of the polymer blend was milled for 3 minutes on a roll mill at about 138° C, after banding commenced, to further homogenize and densify it. The melt flow of the sample was determined as before. Also, film samples for the dynamic viscoelastic measurements were prepared from each polymer blend by compression molding 1 g samples at 5000 psig (34.5 MPa gage) for 4 minutes and then for 1 minute at 30,000 psig (206.8 MPa gage). The samples were cooled in about 10–15 minutes to about 88° C while under 30,000 psig pressure by passing cooling water through the press and the samples then removed. Measurements of dynamic modulus and loss angle were carried out on the samples thus prepared by means of a Vibron Direct Reading Viscoelastometer, Model DVV-II (Toyo Instruments Co., Tokyo, Japan). All experiments were made on test specimens cut from the molded film which were about ⅛ inch wide (0.05 cm), 1.2 inches long (3 cm) and about 0.010 inch (0.025 cm) in thickness. Each specimen was tested at 35 Hz at temperatures ranging from about −100° C to about 20° C.

The dart impact values were determined from injection molded specimens from each blend which had dimensions, 1¼ inches (3.2 cm), 1¾ inches (4.4 cm) and 0.1 inch (0.2 cm). Each specimen was clamped in a holder so that it was supported around its perimeter and a brass bullet-shaped dart weighing 1.123 lbs (0.509 kg) dropped one time on it. The impact value in inch-lbs was determined from the height at which 2 out of 4 specimens were ruptured by the dart.

The calculated molecular weights of each precoupled styrene-butadiene block for each sample, weight % of each high and low molecular weight, calculated polystyrene block HI, Vibron test results and falling dart impact results are presented in Table 2.

The calculated HI as defined herein for each component of the blends was 1.

Table 2
Properties of Mixed, Coupled Styrene-Butadiene Block Copolymers

| Combined Runs Table 1 | New Run No. | Blend Melt Flow (g/10 min) | High Molecular Weight Portion | | | | Low Molecular Weight Portion | | | | Calculated Styrene Block HI | Vibron Results | | Falling Dart Impact | | Remarks |
|---|---|---|---|---|---|---|---|---|---|---|---|---|---|---|---|---|
| | | | Precoupled Block Molecular Weight × 10⁻³ | | Wt. % | Coupling | Precoupled Block Molecular Weight × 10⁻³ | | Wt. % | Coupling | | Tanα Max 20° C | °C T(tanα Max) | (in-lbs) | (joules) | |
| | | | S | B | | | S | B | | | | | | | | |
| 1&1A | 10 | 1.1 | 203 | 18 | 54 | linear | 15.5 | 13.2 | 46 | radial | 3.5 | 0.086 | −84 | 22 | 2.5 | Invention |
| 2&2A | 20 | 4.0 | 103 | 14 | 57 | linear | 13.9 | 10.0 | 43 | radial | 2.2 | 0.034 | −84 | 11 | 1.2 | Control |
| 3&3A | 30 | 1.7 | 152 | 21 | 57 | linear | 15.6 | 11.3 | 43 | radial | 2.7 | 0.052 | −85 | 20 | 2.3 | Invention |
| 4&4A | 40 | 2.1 | 203 | 18 | 54 | radial | 15.5 | 13.2 | 46 | linear | 3.5 | 0.133 | −82 | 40 | 4.5 | Invention |
| 5&5A | 50 | 21.0 | 160 | 9 | 63 | linear | 7 | 9 | 37 | radial | 4.9 | — | — | 10 | 1.1 | Control |
| na[1] | 60 | 6.0 | 56 | 19 | 100 | radial | na | na | na | na | 1.0 | 0.027 | −93 | <10 | <1.1 | Comparison |
| na | 70 | 6.0 | 139 | 11 | 62 | radial | 11 | 11 | 38 | radial | 3.0 | 0.149 | −78 | 53 | 6.0 | Comparison |

[1] Not applicable.

The invention blends of Runs 10, 30 and 40 are prepared by mixing together suitable quantities of a coupled linear and a coupled radial block copolymer in quantities sufficient to satisfy a calculated styrene block HI ranging from about 2.5 to about 4. When these conditions are met, the polymer blends also can exhibit a tan δ max. value ranging from about 0.045 to about 0.200, a T(tan δ max) value ranging from about −87° to about −75° C and dart impact values ranging from about 20 in-lbs to greater than 80 in-lbs (test limit. Micrographs taken of radial polymer having chains of different lengths attached to a central nucleus as disclosed in said U.S. Pat. No. 3,639,517 as exemplified in comparison Run 70, which exhibits tan δ max. of 0.149, T(tan δ max) of −78° C, dart impact of 53 in-lbs and a HI of 3, show a lamellar morphology. Such polymers have alternating layers of polystyrene and polybutadiene. Since the invention blends have properties falling within the mentioned limits set forth above, it is reasoned that they also possess lamellar morphology characteristic of the high impact styrene-butadiene resins.

Radial polymers having chains of substantially uniform lengths attached to a central nucleus such as those illustrated by comparison Run 60, exhibit impact values sufficient for many applications but these values are only a fraction of those that can be obtained in accordance with this invention. This sample has a tan δ max of 0.027, a T(tan δ max) of −93° C, a dart impact of less than 10 in-lbs and a HI of only 1. Micrographs taken of similar radial polymers having branched chains of substantially equal length attached to a central nucleus show them to possess a spherical morphology in which spheres of polybutadiene are embedded in a polystyrene continuum. When an article molded from such a resin is subjected to impact, the polystyrene phase takes most of the shock, hence the relatively low impact strength.

The characteristic properties for the control Run 20 polymer blend generally are below the criteria set forth for the invention polymer blends. It is reasoned that as a result, this blend does not possess lamellar morphology and hence the relatively low impact strength.

Invention Runs 10, 30 and 40 demonstrate that impact resistant polymer blends that meet the criteria set forth can be prepared by mixing together a relatively high molecular weight linear or radial styrene-butadiene block copolymer with a relatively low molecular weight radial or linear styrene-butadiene block copolymer. The results suggest that the best results are obtained when the high molecular weight copolymer has a radial configuration. Control Run 20 and Invention Run 30, being in a transition area, may exhibit cylindrical morphology as discussed above. Control Run 50 shows the poor impact obtained if the HI is too high.

It is preferred that the difference between the number average molecular weight of the polymerized diene blocks of the linear component of the blend and the radial component be less than about 10,000.

The blends of this invention are suitable for use in conventional plastics fabricating equipment such as, for example, extruders, injection molding machines, blow molders, compression molders, thermoformers, and the like.

While this invention has been described in detail, the purpose of illustration is not to be construed as limited thereby but is intended to cover all changes and modifications within the spirit and scope thereof.

I claim:
1. A composition comprising a blend of:
   (1) at least one resinous radial block copolymer of at least one monovinyl-substituted aromatic compound and at least one conjugated diene, said radial block copolymer having a configuration $(A—B)_nY$, wherein A represents a block of polymerized monovinyl-substituted aromatic compound, B represents a block of polymerized conjugated diene, Y represents a residue of a polyfunctional coupling agent, and $n$ represents the number of functional groups of the coupling agent which have entered into the coupling reaction and is an integer of at least 3, said monovinyl-substituted aromatic compound blocks having a heterogeneity index outside the range of 2.5 to 4; and
   (2) at least one resinous linear block copolymer of at least one monovinyl-substituted aromatic compound and at least one conjugated diene, said resinous linear block copolymer having a configuration selected from A—B—A and $(A—B)_2X$, wherein A and B are as defined above and X is a residue of a difunctional coupling agent, said monovinyl-substituted aromatic compound blocks having a heterogeneity index outside the range of 2.5 to 4;
   said blend having a heterogeneity index of said monovinyl-substituted aromatic compound blocks within the range of 2.5 to 4.

2. A composition according to claim 1 wherein said copolymers are each copolymers of styrene and 1,3-butadiene.

3. A composition according to claim 2 wherein said blend exhibits a morphology characterized by an alternating lamellar configuration.

4. A composition according to claim 2 wherein said polymerized diene blocks of said radial copolymer and said linear copolymer differ in number average molecular weight by less than 10,000.

5. A composition according to claim 2 wherein a ratio of said radial copolymer to said linear copolymer is within the range of 10:90 to 90:10.

6. A composition according to claim 1 wherein said resinous radial block copolymer of (1) is produced by sequential addition of a monovinyl-substituted aromatic compound and initiator, a conjugated diene, and a polyfunctional coupling agent, which polyfunctional coupling agent has at least three functional groups; and
   said resinous linear block copolymer of (2) is produced by either sequential addition of a monovinyl-substituted aromatic compound and an initiator, a conjugated diene, and a second increment of monovinyl-sbustituted aromatic compound, or the sequential addition of a monovinyl-substituted aromatic compound and an initiator, a conjugated diene, and a difunctional coupling agent.

7. A composition according to claim 6 wherein said monovinyl-substituted aromatic compounds of (1) and (2) are styrene and said conjugated dienes of (1) and (2) are 1,3-butadiene.

8. A composition according to claim 7 wherein said blend exhibits a morphology characterized by an alternating lamellar configuration.

9. A composition according to claim 7 wherein said initiator is added in a single increment in the polymerization of each of said block copolymers.

10. A composition according to claim 7 wherein said polymers of (1) and (2) are produced in situ utilizing sequential addition of said monovinyl-substituted aromatic compound and initiator, said-conjugated diene, and a mixture of a coupling agent which is difunctional and a coupling agent having at least three reactive sites.

* * * * *